United States Patent
Tsutsumi et al.

(10) Patent No.: US 9,085,982 B2
(45) Date of Patent: Jul. 21, 2015

(54) GAS TURBINE

(71) Applicant: MITSUBISHI HEAVY INDUSTRIES, LTD., Tokyo (JP)

(72) Inventors: Eiichi Tsutsumi, Tokyo (JP); Kenichi Arase, Tokyo (JP); Shinya Hashimoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 429 days.

(21) Appl. No.: 13/663,579

(22) Filed: Oct. 30, 2012

(65) Prior Publication Data
US 2013/0243576 A1    Sep. 19, 2013

(30) Foreign Application Priority Data
Mar. 19, 2012    (JP) .................. 2012-062126

(51) Int. Cl.
*F01D 5/08*    (2006.01)
*F02C 7/16*    (2006.01)

(52) U.S. Cl.
CPC . *F01D 5/081* (2013.01); *F02C 7/16* (2013.01); *F05D 2260/205* (2013.01); *F05D 2260/2322* (2013.01)

(58) Field of Classification Search
CPC .......... F01D 5/081; F01D 11/24; F01D 25/08; F01D 2260/2322; F01D 2260/205; F02C 7/16
See application file for complete search history.

(56) References Cited

U.S. PATENT DOCUMENTS

| | | | |
|---|---|---|---|
| 5,116,199 A | 5/1992 | Ciokajlo | |
| 5,167,488 A * | 12/1992 | Ciokajlo et al. | 415/175 |
| 5,399,066 A * | 3/1995 | Ritchie et al. | 415/115 |
| 5,980,201 A * | 11/1999 | Benoist et al. | 415/115 |
| 6,035,929 A * | 3/2000 | Friedel et al. | 415/116 |
| 6,185,925 B1 | 2/2001 | Proctor et al. | |
| 6,224,328 B1 | 5/2001 | Weigand et al. | |
| 6,454,529 B1 * | 9/2002 | Zearbaugh et al. | 415/173.2 |

FOREIGN PATENT DOCUMENTS

| | | |
|---|---|---|
| GB | 2048386 A | 12/1980 |
| JP | 8-215879 A | 8/1996 |

(Continued)

OTHER PUBLICATIONS

International Search Report of PCT/JP2012/078110, mailing date of Jan. 29, 2013, w/English tranlsation.
Written Opinion of PCT/JP2012/078110, mailing date of Jan. 29, 2013.
English translation of the Written Opinion of PCT/JP2012/078110, mailing date of Jan. 29, 2013 (6 pages).

(Continued)

*Primary Examiner* — Igor Kershteyn
(74) *Attorney, Agent, or Firm* — Westerman, Hattori, Daniels & Adrian, LLP

(57) ABSTRACT

A gas turbine includes a blade ring which faces blades from the outer side in a radial direction perpendicular to a turbine shaft, and a channel provided in the blade ring 1 and through which a cooling medium is flowed. The channel includes an inner channel formed in the blade ring 1, and a tubular outer channel which is connected to the inner channel, is disposed in an outer portion of the blade ring 1, and extends in a circumferential direction of the blade ring 1. The outer channel includes a plurality of fixing portions fixed to the blade ring 1 and a thermal stress absorbing portion disposed between the fixing portions adjacent in the circumferential direction and expandable and contractible in the circumferential direction.

3 Claims, 7 Drawing Sheets

(56) References Cited

FOREIGN PATENT DOCUMENTS

| | | |
|---|---|---|
| JP | 2000-80926 A | 3/2000 |
| JP | 2002-309906 A | 10/2002 |
| JP | 2002-309907 A | 10/2002 |
| JP | 2005-188857 A | 7/2005 |
| JP | 4274666 B2 | 6/2009 |

OTHER PUBLICATIONS

Chinese Office Action dated Mar. 17, 2015, issued in CN Patent Application No. 201280067025.2 with English partial translation (10 pages).

* cited by examiner

GAS TURBINE

TECHNICAL FIELD

The present invention relates to a gas turbine in which a channel through which a cooling medium such as cooling steam is flowed is provided in a blade ring.

The present application claims priority on Japanese Patent Application No. 2012-062126, filed Mar. 19, 2012, the content of which is incorporated herein by reference.

BACKGROUND ART

During operation of a gas turbine, a blade ring thermally expands due to the high temperature combustion gas flowing thereinside, and clearance between the blade ring and the tips of blades is easily increased. However, the increase of clearance is undesirable in terms of stably maintaining the performance of the gas turbine.

Therefore, a channel through which cooling steam (cooling medium) is flowed is provided in the blade ring, and thermal expansion of the blade ring is suppressed (for example, refer to Patent Documents 1 and 2 below). In the gas turbine, a plurality of combustors are arranged in the circumferential direction in the upstream side in the turbine shaft direction of the blade ring. The combustors are also cooled using the cooling steam passing through the blade ring.

In a gas turbine disclosed in Patent Document 1 below, an inner channel and an outer channel are provided as the channel of the cooling steam of the blade ring. The inner channel is formed in the blade ring. The outer channel is connected to the inner channel, is disposed in the outer portion of the blade ring, and is formed in a tubular shape which extends in the circumferential direction of the blade ring.

Moreover, the cooling steam performs heat exchange by being flowed through the inner channel and cools the blade ring, and is fed to the combustor and cools the combustor. The cooling steam (superheated steam) which has reached high temperature due to the heat exchange with the inner channel and the combustor is mainly recovered through the outer channel so as not to increase the temperature of the blade ring.

PRIOR ART DOCUMENT

Patent Document

Patent Document 1: Japanese Patent No. 4274666
Patent Document 2: Japanese Unexamined Patent Application, First Publication No. 2002-309906

DISCLOSURE OF THE INVENTION

Problem that the Invention is to Solve

However, in the above-described conventional gas turbine, there are the following problems.

That is, a thermal elongation difference is generated due to a mutual temperature difference between the blade ring and the outer channel which extends in the outer portion of the blade ring. Thereby, high thermal stresses occur in a portion such as a fixing portion through which the outer channel is fixed to the blade ring.

The present invention is made in consideration of the above-described circumstances, and an object thereof is to provide a gas turbine capable of alleviating thermal stress generated due to a thermal elongation difference between a blade ring and an outer channel thereof.

Means for Solving the Problem

In order to achieve the object, the present invention provides the following means.

That is, a gas turbine according to a first aspect of the present invention includes: a blade ring which faces blades from the outer side in a radial direction perpendicular to a turbine shaft; and a channel provided in the blade ring and through which a cooling medium is flowed, wherein the channel includes: an inner channel formed in the blade ring; and a tubular outer channel which is connected to the inner channel, is disposed in an outer portion of the blade ring, and extends in a circumferential direction of the blade ring, and the outer channel includes: a plurality of fixing portions fixed to the blade ring; and a thermal stress absorbing portion which is disposed between the fixing portions adjacent in the circumferential direction and is expandable and contractible in the circumferential direction.

In the gas turbine according to the first aspect of the present invention, the blade ring is cooled by flowing a cooling medium such as cooling steam through the channel, and the thermal expansion of the blade ring toward the outer side in the radial direction is suppressed. Thereby, an increase of the clearance between the blade ring and the tip of the blade during operation is suppressed, and performance of the gas turbine is stably maintained.

In addition, the cooling medium performs heat exchange by being flowed through the inner channel and cools the blade ring. The cooling medium which has reached high temperature due to the heat exchange is recovered through the outer channel so as not to increase the temperature of the blade ring.

According to the gas turbine related to the first aspect of the present invention, since the outer channel includes the thermal stress absorbing portion which is expandable in the circumferential direction between fixing portions adjacent in the circumferential direction, the following effects are exhibited.

That is, even if a thermal elongation difference occurs due to mutual temperature differences between the blade ring and the outer channel disposed in the outer portion of the blade ring and extending in the circumferential direction, the thermal stress absorbing portion expands and contracts, and thus, the thermal elongation difference can be absorbed, and thermal stress is decreased.

Thereby, since deformation or damage of the channel (for example, the fixing portion of the outer channel or the like) is prevented, performance of the gas turbine can be stably increased.

The thermal stress absorbing portion of the gas turbine may be a bellows tube.

In this case, the thermal stress absorbing portion can be simply manufactured.

The thermal stress absorbing portion of the gas turbine may be a tube bent so as to be folded in a direction crossing the circumferential direction.

In this case, even if a thermal elongation difference occurs due to mutual temperature differences between the blade ring and the outer channel disposed in the outer portion of the blade ring and extending in the circumferential direction, the tube bent so as to be folded in the direction crossing the circumferential direction bends in the circumferential direction (that is, expands and contracts in the circumferential direction as a thermal stress absorbing portion), and thus, the thermal stress is decreased.

Accordingly, it is possible to reduce the manufacturing cost while securing performance of the thermal stress absorbing portion.

Effects of the Invention

According to the gas turbine of the present invention, it is possible to alleviate the thermal stress generated due to the thermal elongation difference between the blade ring and the outer channel thereof.

Figure 1:
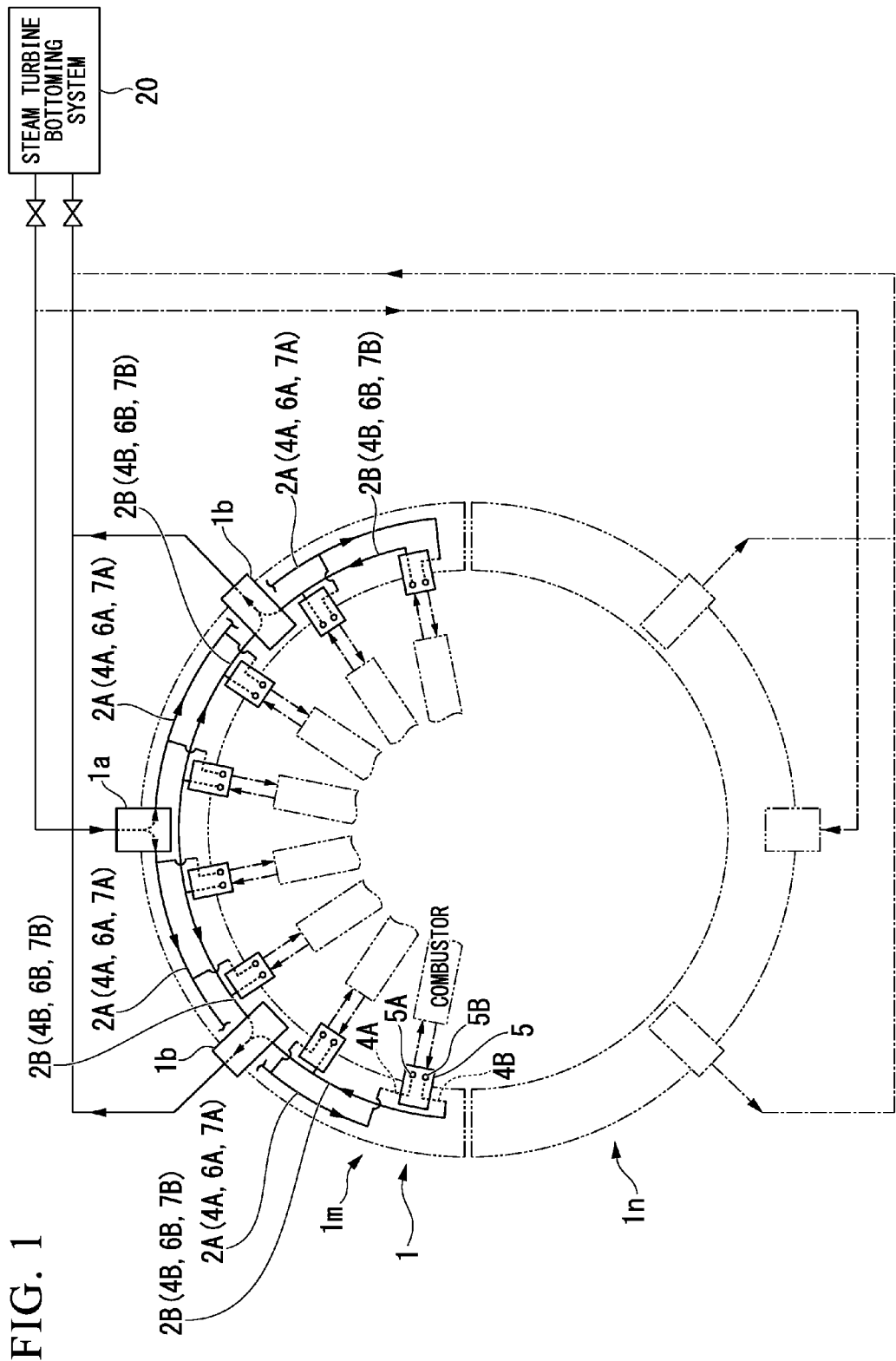
FIG. 1 is a system diagram of a cooling medium of a blade ring of a gas turbine according to a first embodiment of the present invention.

BEST MODE FOR CARRYING OUT THE INVENTION (First Embodiment)

A gas turbine according to an embodiment of the present invention mixes compressed air generated in a compressor with a fuel and combusts the mixture in a combustor, and generates high temperature and high pressure combustion gas. Moreover, the combustion gas is flowed into the turbine, and thus, a rotor of the turbine is rotated around a turbine shaft C, and rotational power is obtained.

A plurality of blade rings 1 which are coaxial with the turbine shaft C are disposed in the turbine shaft C direction in the turbine. The blade rings 1 support vanes from the outer side in the radial direction. The blade ring 1 faces blades adjacent to the vanes in the turbine shaft C direction from the outer side in the radial direction with an interval (clearance) between tips of the blades and the blade ring.

Moreover, in the present specification, the compressor side of the combustor along the turbine shaft C direction is referred to as an upstream side, and the turbine side of the combustor is referred to as a downstream side. A direction perpendicular to the turbine shaft C direction is referred to as a radial direction, and a direction which rotates around the turbine shaft C is referred to as a circumferential direction.

Hereinafter, a gas turbine according to the first embodiment of the present invention will be described with reference to drawings.

The gas turbine of the present embodiment is a gas turbine which cools the blade ring 1 using cooling steam as an example of a cooling medium. The gas turbine includes the above-described blade ring 1 and a channel 2 provided in the blade ring 1 and of which the cooling steam is flowed through the inner portion.

A pair of semi-annular segment bodies is combined, and the entire blade ring 1 is formed in an annular shape.

In the outer circumferential surface of the blade ring 1, a tubular steam supply portion 1a and steam discharging portion 1b protrude so that the axes of the portions face the radial direction.

The cooling steam is supplied from a steam turbine bottoming system to the channel 2 through the steam supply portion 1a. After the cooling steam cools the blade ring 1, the cooling steam is returned to the steam turbine bottoming system from the steam discharging portion 1b.

Moreover, the blade ring 1 of the present embodiment is the blade ring 1 which faces a 1st stage blades disposed so as to be close to the combustor. After the cooling steam cools the blade ring 1, the cooling steam is flowed through the channel of the combustor and cools the combustor. Thereafter, the cooling steam is returned to the steam turbine bottoming system from the channel 2 of the blade ring 1 again.

FIG. 1 shows a system diagram of cooling steam for a blade ring. FIG. 1 shows the cooling system formed in an upper half blade ring 1m of the blade ring 1. Although the description of the system in a lower half blade ring 1n of the blade ring 1 is omitted, the system of the lower half blade ring 1n is similar to that of the upper half blade ring 1m. The upper half blade ring 1m is integrated with the lower half blade ring 1n, and thereby a single blade ring 1 is formed.

In FIG. 1, the cooling steam is supplied to the steam supply portion 1a, which is provided on the upper half blade ring 1m, as a cooling medium of the blade ring 1 from the steam bottoming system 20. Meanwhile, after the cooling steam cools the blade ring 1, the cooling steam is returned to the steam bottoming system 20 from the steam discharging portion 1b provided on the blade ring 1. Moreover, in the reference numerals of the channel 2 described below, a reference numeral 2A is attached to a steam supply system, a reference numeral 2B is attached to a steam return system (steam discharge system), and both systems are distinguished from each other.

After the cooling steam supplied to the blade ring 1 cools the blade ring 1, the cooling steam cools the combustor, is temporarily returned to the blade ring 1, and then is discharged to the steam bottoming system 20 from the steam discharging portion 1b. In the blade ring 1, a port 5 which is integrally formed to the blade ring 1 is provided so as to correspond to the position of each combustor for delivery of the cooling steam to each corresponding combustor. Each port 5 includes a connection port 5A which sends the cooling steam to the combustor and a connection port 5B which receives the cooling steam returned from the combustor. In addition, in the example shown in FIG. 1, an example in which eight combustors are disposed to the upper half blade ring 1m is shown. However, the present invention is not limited to the example.

In FIG. 1, the cooling steam supplied from the steam supply portion 1a to the upper half blade ring 1m is divided into two systems and is flowed to the channel 2A. In addition, the cooling steam is supplied to the port 5 while cooling the blade ring 1m and is supplied to the combustor from the connection port 5A. After the cooling steam cools the combustor, the cooling steam is supplied to the upper half blade ring 1m from the connection port 5B of the port 5 and is returned to the steam discharging portion 1b via the channel 2B.

The channel 2A, which supplies the cooling steam to the connection port 5A of the port 5 from the steam supply portion 1a, includes channels 4A, 6A, and 7A described below. The channel 2B, in which the cooling steam which is returned from the combustor and is discharged to the steam discharging portion 1b from the connection port 5B of the port 5 is flowed, includes channels 4B, 6B, and channel 7B described below.

In the channel 2A and channel 2B, the tubular outer channels (6A, 6B, 7A, and 7B) disposed in the outer portion of the blade ring 1 are indicated by a solid line. An inner channel 4 (4A and 4B) indicated by a broken line is disposed in the inner portion of the blade ring 1 between the outer channels and the connection ports 5A and 5B of each port 5, and the blade ring 1 is cooled by the cooling steam. Moreover, classification and combination of the outer channel and the inner channel shown in FIG. 1 are examples, and the present invention is not limited to the examples.

Next, the details of the configuration of the channel which cools the blade ring using a cooling medium will be described below with reference to FIGS. 2 to 7. The channels 2A and 2B include inner channels 4A and 4B formed in the blade ring 1, and tubular outer channels 6A, 6B, 7A, and 7B which are connected to the inner channels 4A and 4B, are disposed in the outer portion of the blade ring 1, and extend in the circumferential direction of the blade ring 1.

Figure 2:
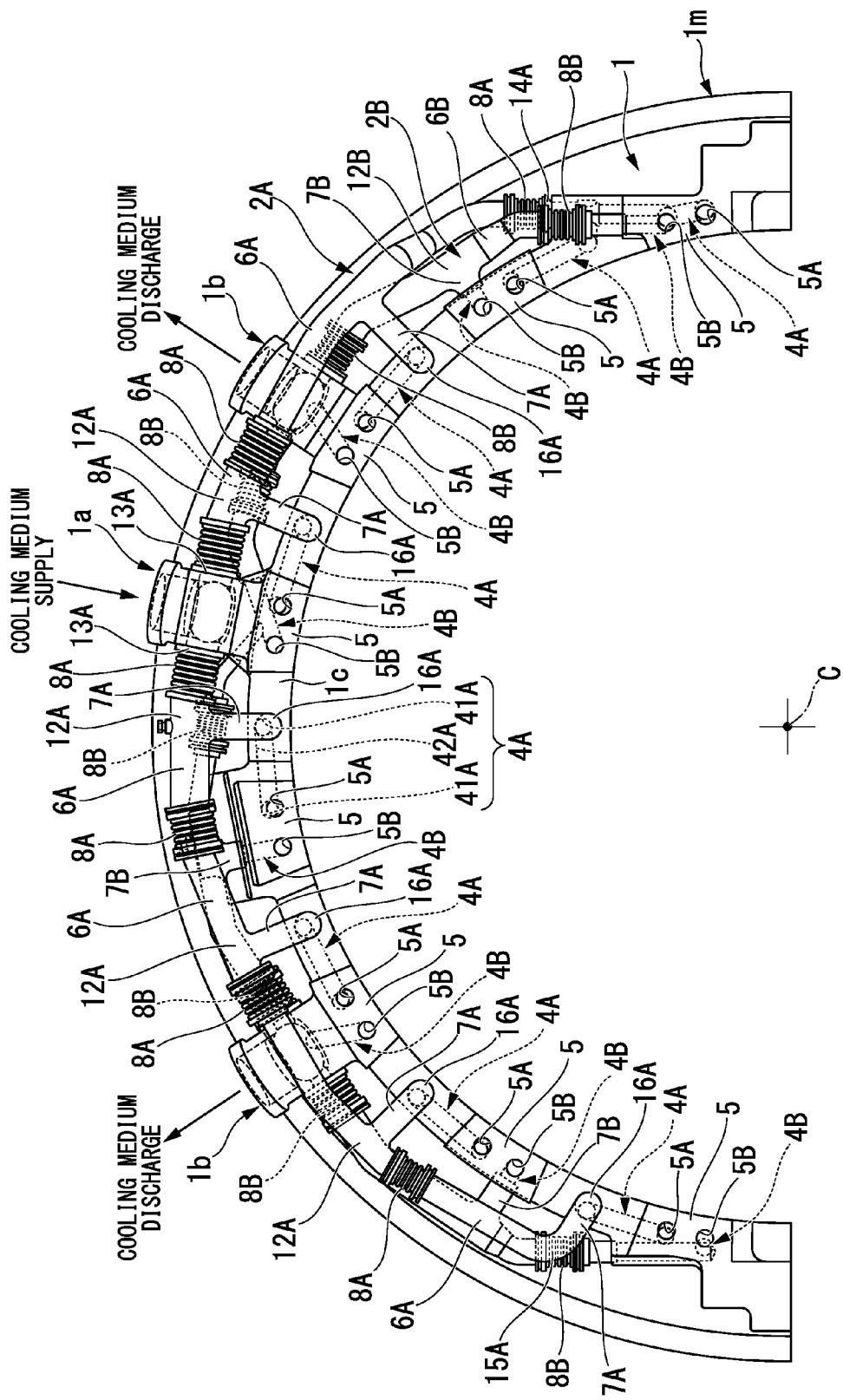
FIG. 2 is a front view when the blade ring of the gas turbine according to the first embodiment of the present invention is viewed from the direction of a turbine shaft.

In FIG. 2, the port 5 which includes the connection ports 5A and 5B which are piping performing delivery of the cooling steam to the combustor is disposed at the position facing each combustor on an end surface 1c which faces the upstream side in the turbine shaft C direction of the blade ring 1. The connection port 5A supplies the cooling steam to the channel of the combustor from the inner channel 4A. The connection port 5B recovers the steam, which performs heat exchange in the inner portion of the combustor after being supplied to the combustor from the connection port 5A, in the inner channel 4B from the channel of the combustor. The connection ports 5A and 5B are opened so as to be adjacent in the circumferential direction. The connection ports 5A and 5B adjacent to each other are connected to both end portions of the channel of the combustor which face the connection ports 5A and 5B.

In FIG. 2, the plurality of inner channels 4 are formed with intervals in the circumferential direction in the blade ring 1.

Specifically, the inner channel 4 (4A and 4B) includes the first inner channel 4A and the second inner channel 4B. The first inner channel 4A is a steam supply system through which the steam which cools the blade ring 1 and the combustor is flowed. The second inner channel 4B is a steam discharge system through which the steam, which has been recovered from the combustor and been subjected to the heat exchange, is flowed. In the shown example, the first and second inner channels 4A and 4B are alternately disposed in the circumferential direction. Specifically, eight pairs of inner channels 4A and 4B are formed so as to correspond to the positions of the combustors arranged in the circumferential direction in the segment bodies (upper half blade ring 1m and lower half blade ring 1n) of the blade ring 1 formed in a semi-annular shape.

The first inner channel 4A is formed by linking channel portions 41A which extend in the turbine shaft C direction and a channel portion 42A which extends in the circumferential direction, and extends so as to be bent in a U shape in the blade ring 1. In the example of FIG. 2, after the first inner channel 4A extends from the end surface 1c which faces the upstream side (the front side in the directions perpendicular to the paper surface of FIG. 2) in the turbine shaft C direction in the blade ring 1 toward the downstream side (the rear side in the directions perpendicular to the paper surface of FIG. 2) in the turbine shaft C direction, the first inner channel is bent in the circumferential direction and extends toward the upstream side so as to be folded again (refer to FIG. 3 for the upstream side and the downstream side in the turbine shaft C direction in the blade ring 1).

In FIG. 2, the channel portions 41A which extend in the turbine shaft C direction in the first inner channel 4A are separated in the circumferential direction and are formed into a pair in each first channel 4A. All the channel portions 41A are connected to connection ports 5A opened to the end surface 1c of the blade ring 1. In the pair of channel portions 41A, the opening portion of one channel portion 41A (the right channel portion 41A in FIG. 2) to the end surface 1c is connected to a fixing portion 16A of the first outer channel (6A and 7A) described below. The opening portion of the other channel portion 41A (the left channel portion 41A in FIG. 2) disposed in the wake flow side to the end surface 1c is a connection port 5A. The channel portions 41A extend parallel to each other along the turbine shaft C direction as shown by a broken line in FIG. 2.

In FIG. 2, the channel portion 42A which extends in the circumferential direction in the first inner channel 4A connects end portions of the downstream side in the turbine shaft C direction of the pair of channel portions 41A in each first inner channel 4A, and extends in a linear shape or a curve shape. The channel portion 42A is formed in the main body of the blade ring 1 so as to correspond to the pair of channel portions 41A, and both ends of the channel portion 42A are connected to the channel portions 41A.

In FIG. 2, in the inner channel 4 (4A and 4B), as described above, the first inner channel 4A is formed so that the entire length is secured to be long. The second inner channel 4B is formed so that the entire length is as short as possible.

Figure 4:
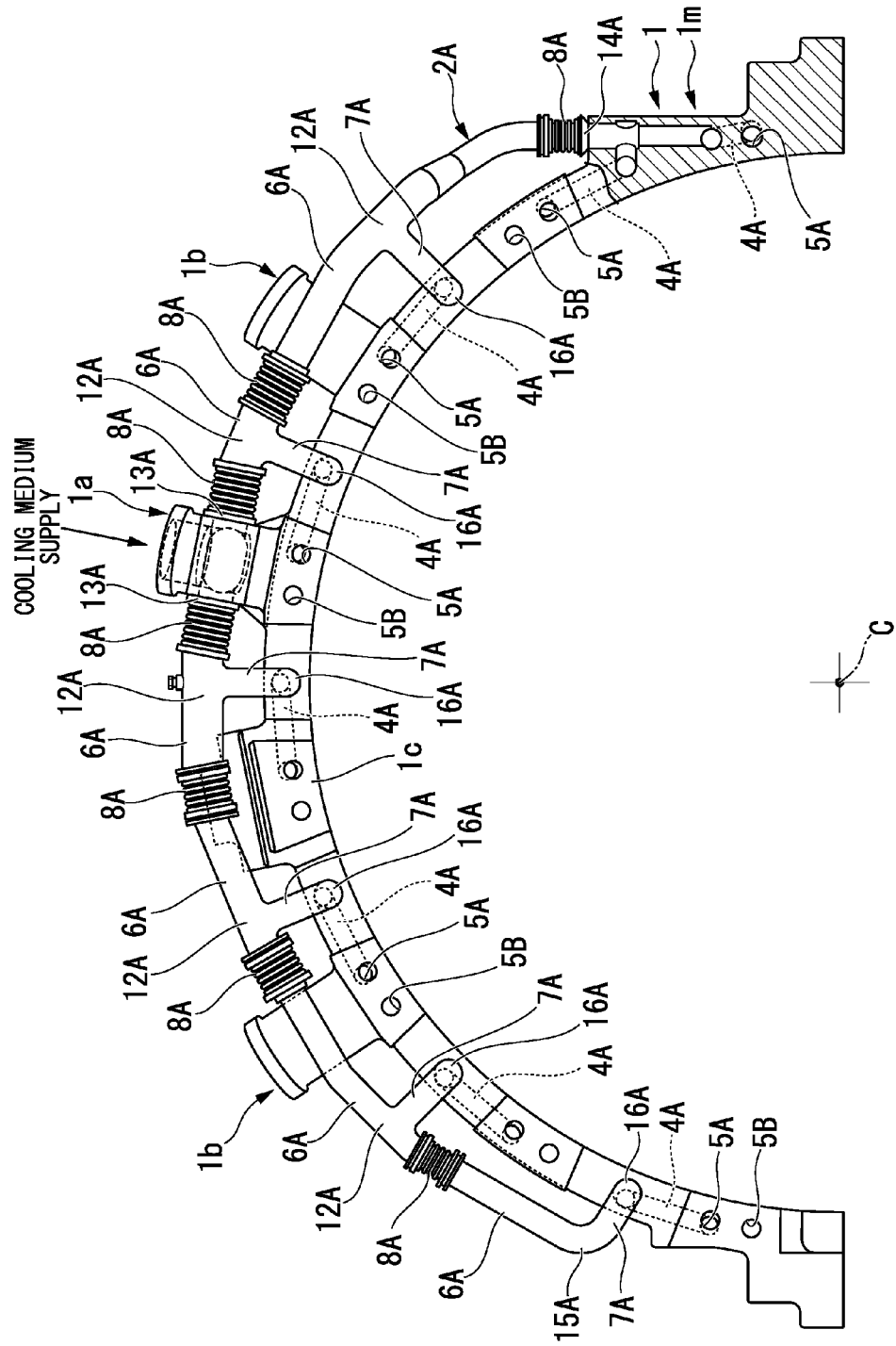
FIG. 4 is a view explaining an outer channel for supplying steam in the blade ring of FIG. 2.

In FIG. 4, the outer channel (first outer channel) of the steam supply system is disposed in the outer side in the radial direction of the blade ring 1 and includes a tube portion 6A and a tube portion 7A. The tube portion 6A extends along the circumferential direction. The tube portion 7A is branched from the tube portion 6A and extends along the radial direction, and the end portion of the tube portion 7A is connected to the first inner channel 4A of the blade ring 1.

Figure 5:
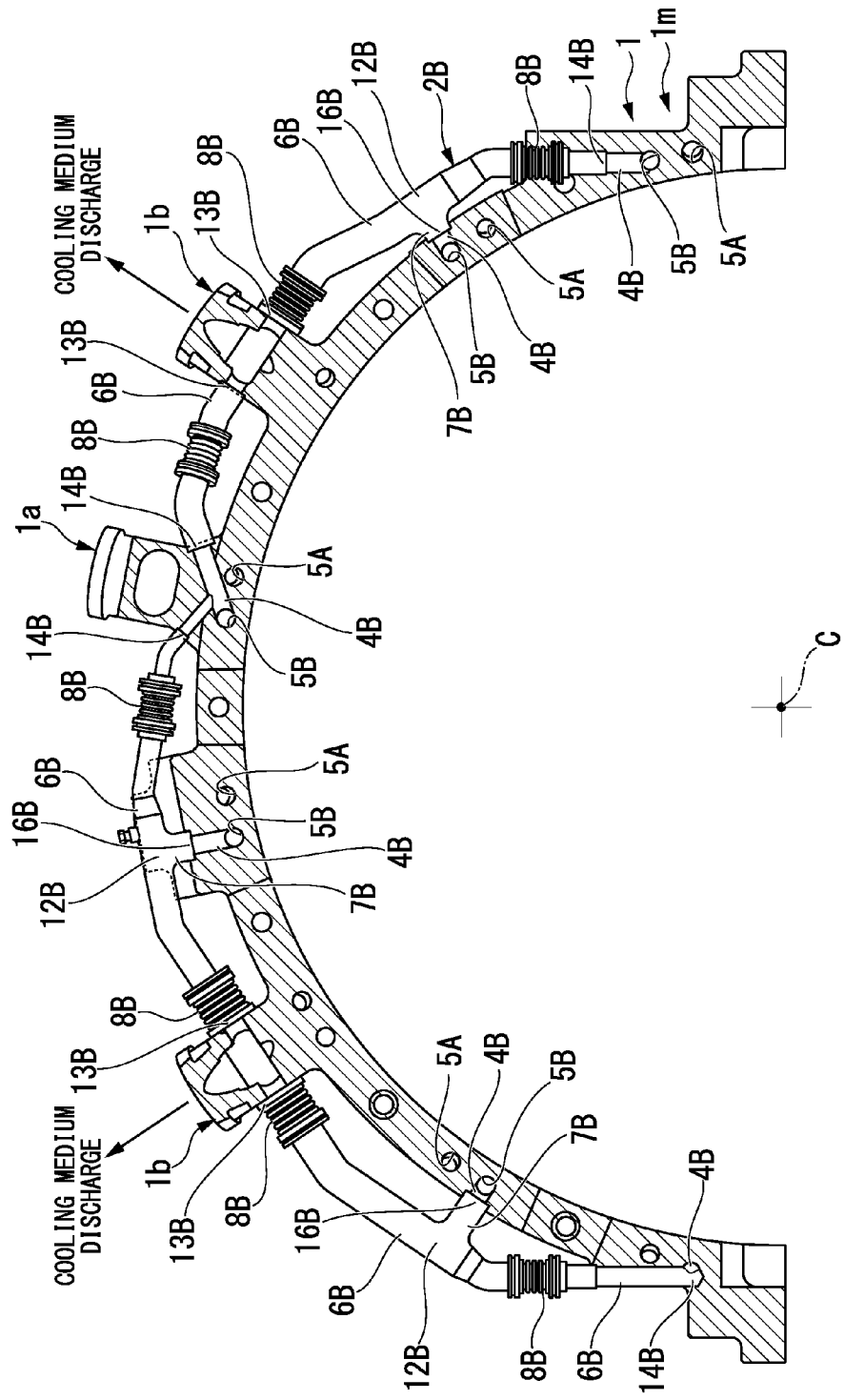
FIG. 5 is a view explaining an outer channel for discharging steam in the blade ring of FIG. 2.

Similarly, in FIG. 5, the outer channel (second outer channel) of the steam discharge system is disposed in the outer side in the radial direction of the blade ring 1 and includes a tube portion 6B and a tube portion 7B. The tube portion 6B extends along the circumferential direction. The tube portion 7B is branched from the tube portion 6B and extends along the radial direction, and the end portion of the tube portion 7B is connected to the second inner channel 4B of the blade ring 1.

The tube portion 6A is connected to the steam supply portion 1a, and in the shown example, the pair of tube portions 6A is provided on both sides in the circumferential direction while interposing the steam supply portion 1a. In the tube diameter (inner diameter) of the tube portion 6A, the diameter in the portion connected to the steam supply portion 1a is the largest. The tube diameter of the tube portion 6A is set so as to be decreased in stages (so as to be decreased in stages whenever crossing the bifurcated portion of tube portion 6A from the tube portion 7A) as the tube portion 6A is separated from the steam supply portion 1a.

In FIGS. 2 and 4, the end portion 16A of the inner side in the radial direction of the tube portion 7A is supported so as to be fixed to the end surface 1c which faces the upstream side in the turbine shaft C direction in the blade ring 1. The end portion 16A of the tube portion 7A is a fixing portion which fixes the first outer channel to the blade ring 1.

A connection end 13A to the steam supply portion 1a in the tube portion 6A also is a fixing portion which fixes the first outer channel to the blade ring 1.

In one tube portion (the tube portion positioned at the right side of the steam supply portion 1a in FIG. 4) of the pair of tube portions 6A, the end portion 14A of the side opposite to the steam supply portion 1a of both end portions in the circumferential direction of the one tube portion 6A is directly fixed to the outer circumferential surface of the blade ring 1 without going through the tube portion 7A. The end portion 14A also is a fixing portion which fixes the first outer channel to the blade ring 1.

The fixing portion of the first outer channel includes the fixing portion provided on the blade ring 1 side, a branch piping coupling 12A, and a curved piping coupling 15A. The branch piping coupling 12A branches the channel from the tube portion 6A to the tube portion 7A. The curved piping coupling 15A changes the direction of the channel from the tube portion 6A to the tube portion 7A.

In FIG. 4, the fixing portion provided in the blade ring 1 side includes the connection end 13A and the end portion 14A described above. The branch piping coupling 12A connects the tube portion 6A and the tube portion 7A in a T shape, and the end portion 16A in the inner side in the radial direction of the tube portion 7A is fixed to the blade ring 1. The curved piping coupling 15A is shown in the left end portion in FIG. 4, connects the tube portion 6A and the tube portion 7A in an L shape, and the end portion 16A in the inner side in the radial direction of the tube portion 7A is fixed to the blade ring 1. The shape, the disposition, or the like of the fixing portions of the steam supply system is an example, and the present invention is not limited to the example.

In addition, the first outer channel (6A and 7A) includes a thermal stress absorbing portion 8A disposed between fixing portions adjacent in the circumferential direction and is expandable in the circumferential direction. The thermal stress absorbing portion 8A is provided in the tube portion 6A, and is disposed in an intermediate portion interposed to any of the fixing portion fixed to the blade ring 1, the branch piping coupling 12A, and the curved piping coupling 15A.

The thermal stress absorbing portion 8A of the present embodiment has a bellows structure in which the peripheral wall of the tube is formed in a plurality of folds in the radial direction of the tube. As the thermal stress absorbing portion 8A, a bellows tube (flexible tube) expandable in the circumferential direction of the blade ring 1 can be used. The tube diameters of the bellows tubes are set according to the tube diameter of the part of the tube portion 6A where the bellows tube is disposed respectively, and the tube diameter of the bellows tube close to the steam supply portion 1a is the largest, and the tube diameter of the bellows tube is decreased in stages according to the tube diameter of the tube portion 6A as the bellows tube is separated from the steam supply portion 1a.

As shown in FIG. 5, the plurality of second outer channels (6B and 7B) are disposed in the blade ring 1, and the second outer channel includes the tube portion 6B and the tube portion 7B. The tube portion 6B is disposed in the outer side in the radial direction of the blade ring 1 and extends along the circumferential direction. The tube portion 7B extends along the radial direction, and both ends of the tube portion 7B are connected to the tube portion 6B and the second inner channel 4B of the blade ring 1.

Figure 3:
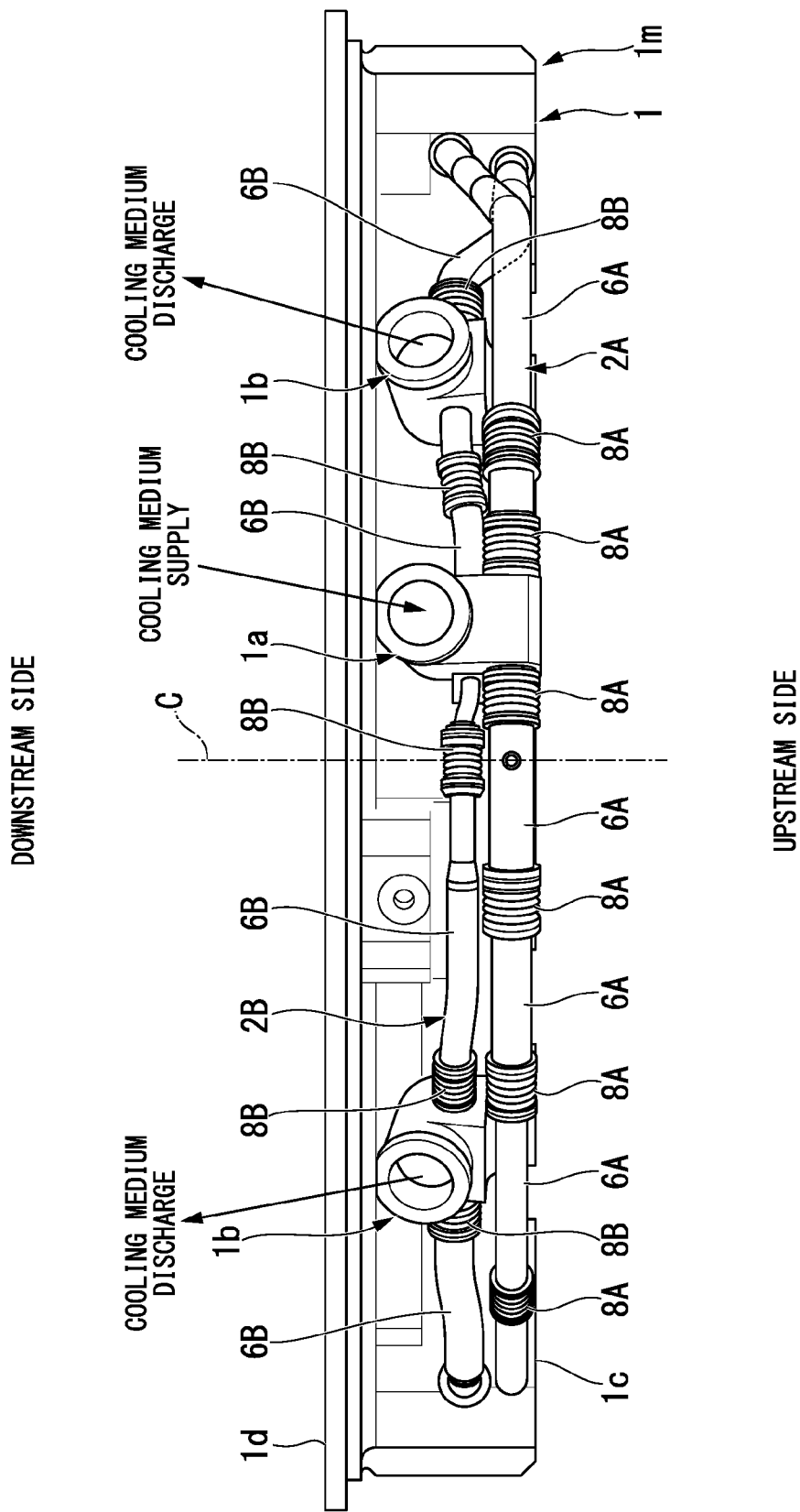
FIG. 3 is a top view when the blade ring of the gas turbine according to the first embodiment of the present invention is viewed from the radial direction.

In FIG. 3, the second outer channel (6B and 7B) is disposed so as to be adjacent to the downstream side (upper side in FIG. 3) in the turbine shaft C direction of the first outer channel (6A and 7A).

As shown in FIG. 5, the tube portions 6B are connected to the steam discharging portion 1b, and in the shown example, a pair of the tube portions 6B is provided in both sides in the circumferential direction while interposing each of the pair of steam discharging portions 1b. In the tube diameter (inner diameter) of the tube portion 6B, the diameter in the portion connected to the steam discharging portion 1b is the largest, and the tube diameter of the tube portion 6B is set so as to be decreased in stages (specifically, so as to be decreased in stages whenever crossing the portion branched from the tube portion 7B) as the tube portion 6B is separated from the steam discharging portion 1b.

In FIG. 5, the end portion 16B of the inner side in the radial direction of the tube portion 7B is supported so as to be fixed to the outer circumferential surface of the blade ring 1. The end portion 16B of the tube portion 7B is a fixing portion which fixes the second outer channel to the blade ring 1.

A connection end 13B to the steam discharging portion 1b in the tube portion 6B also is a fixing portion which fixes the second outer channel to the blade ring 1.

The end portion 14B of the side opposite to the steam discharging portion 1b of both end portions in the circumferential direction of the tube portion 6B is directly fixed to the outer circumferential surface of the blade ring 1 without going through the tube portion 7B. The end portion 14B also is a fixing portion which fixes the second outer channel to the blade ring 1.

The fixing portion of the second outer channel includes the fixing portion provided on the blade ring 1 side and a branch piping coupling 12B. The branch piping coupling 12B branches the channel from the tube portion 6B to the tube portion 7B. In FIG. 5, the fixing portion provided in the blade ring 1 side includes the connection end 13B and the end portion 14B described above. The branch piping coupling 12B connects the tube portion 6B and the tube portion 7B in a T shape, and the end portion 16B in the inner side in the radial direction of the tube portion 7B is fixed to the blade ring 1. In addition, the shape, the disposition, or the like of the fixing portions of the steam discharge system is an example, and the present invention is not limited to the example.

In addition, the second outer channel (6B and 7B) includes a thermal stress absorbing portion 8B disposed between fixing portions adjacent in the circumferential direction and is expandable in the circumferential direction. The thermal stress absorbing portion 8B is provided in the tube portion 6B, and is disposed in an intermediate portion interposed to the fixing portion fixed to the blade ring 1 and the branch piping coupling 12B.

The thermal stress absorbing portion 8B of the present embodiment also can use the bellows tube which has the configuration similar to the above-described thermal stress absorbing portion 8A. The tube diameters of the bellows tubes are set according to the tube diameter of the part of the tube portion 6B where the bellows tube is disposed respectively, the tube diameter of the bellows tube close to the steam discharging portion 1b is the largest, and the tube diameter of the bellows tube is decreased in stages according to the tube diameter of the tube portion 6B as the bellows tube is separated from the steam discharging portion 1b.

In the gas turbine of the above-described present embodiment, the blade ring 1 is cooled by circulating the cooling steam through the channel 2, and the thermal expansion of the blade ring 1 toward the outer side in the radial direction is suppressed. Thereby, an increase of a clearance between the blade ring 1 and the tip of the blade during operation is suppressed, and performance of the gas turbine is stably maintained.

Moreover, in FIG. 4, first, the cooling steam passes through the first outer channel 6A from the steam supply portion 1a and flows to the tube portion 7A via the branch piping coupling 12A or the curved piping coupling 15A. Subsequently, the cooling steam communicates with the first inner channel 4A, performs heat exchange, and thus, cools the blade ring 1. In addition, in the end portion 14A of the tube portion 6A, the cooling steam communicates with the first inner channel 4A without going through the tube portion 7A. Furthermore, the cooling steam flows through the channel of the combustor, performs heat exchange, and thus, cools the combustor. The cooling steam which reaches high temperature by the heat exchange is returned to the blade ring 1 from the combustor. In order not to increase the temperature of the blade ring 1, the cooling steam passes through the second inner channel 4B shown in FIG. 5 which has the short entire length, flows to the tube portion 7B, joins the steam from other system in the branch piping coupling 12B, passes through the second outer channel 6B, and is recovered from the steam discharging portion 1b. Moreover, in the end portion 14B of the tube portion 6B, the cooling steam joins the steam from other system without going through the tube portion 7B.

According to the circulation of the cooling steam, during operation, the temperature is increased in the order of the first outer channel (6A and 7A), the blade ring 1, and the second outer channel (6B and 7B) (that is, the temperature of the outer channel 6B is the highest).

According to the gas turbine of the present embodiment, since the outer channel (6A, 6B, 7A, and 7B) includes the thermal stress absorbing portions 8A and 8B which are expandable in the circumferential direction between fixing portions adjacent in the circumferential direction, the following effects are exhibited.

That is, even if a thermal elongation difference occurs due to mutual temperature differences between the blade ring 1 and the outer channel (6A, 6B, 7A, and 7B) disposed in the outer portion of the blade ring 1 and extending in the circumferential direction, the thermal stress absorbing portions 8A and 8B expand and contract, and thus, the thermal elongation difference can be absorbed, and thermal stress is decreased.

Thereby, since deformation or damage of the channel 2 (for example, the fixing portion of the outer channel (6A, 6B, 7A, and 7B), or the like) is prevented, and performance of the gas turbine can be stably increased.

In the first outer channel (6A and 7A), it is considered that thermal stress occurs in the direction of expanding the first outer channel in the circumferential direction due to the thermal elongation difference between the channel (6A and 7A) and the blade ring 1 having a higher temperature than the channel (6A and 7A). On the other hand, in the gas turbine of the present embodiment, since the thermal stress absorbing portion 8A provided in the first outer channel (6A and 7A) expands in the circumferential direction, the thermal stress is decreased.

In the second outer channel (6B and 7B), it is considered that thermal stress occurs in the direction of contracting the second outer channel in the circumferential direction due to the thermal elongation difference due to the fact that the channel (6B and 7B) has a higher temperature than the blade ring 1. On the other hand, in the gas turbine of the present embodiment, the thermal stress absorbing portion 8B provided in the second outer channel (6B and 7B) contracts in the circumferential direction, and thus, the thermal stress is decreased.

In addition, in the present embodiment, since the thermal stress absorbing portions 8A and 8B are configured of the bellows tube, the thermal stress absorbing portions 8A and 8B can be simply manufactured.

(Second Embodiment)

Next, a gas turbine according to a second embodiment of the present invention will be described with reference to drawings.

In addition, the same reference numerals are attached to the same members as those described in the above-described embodiment, and description thereof is omitted. Moreover, a method of considering the system of the cooling medium shown in FIG. 1 can be also applied to the present embodiment.

Figure 6:
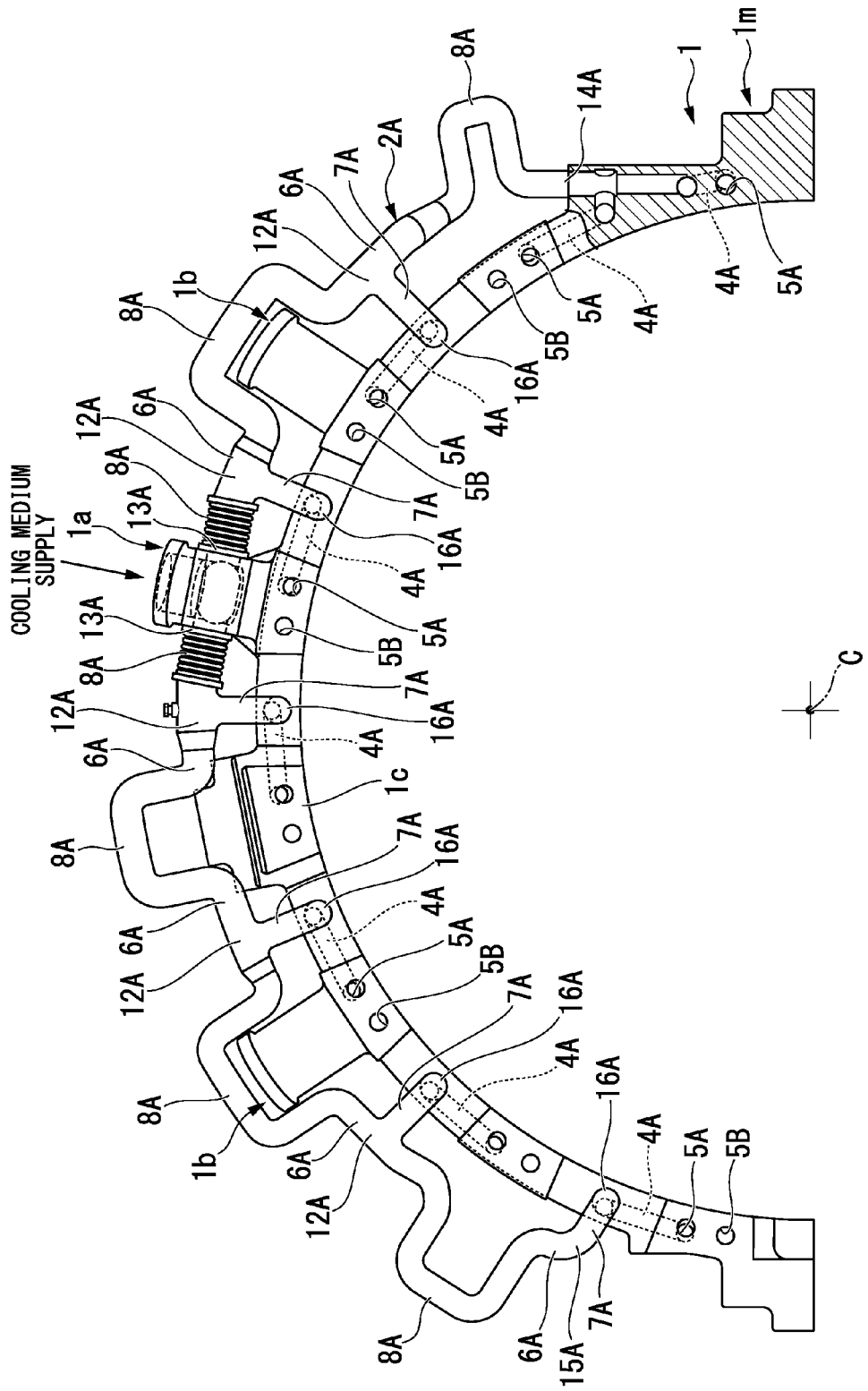
FIG. 6 is a view explaining an outer channel for supplying steam according to a second embodiment.
Figure 7:
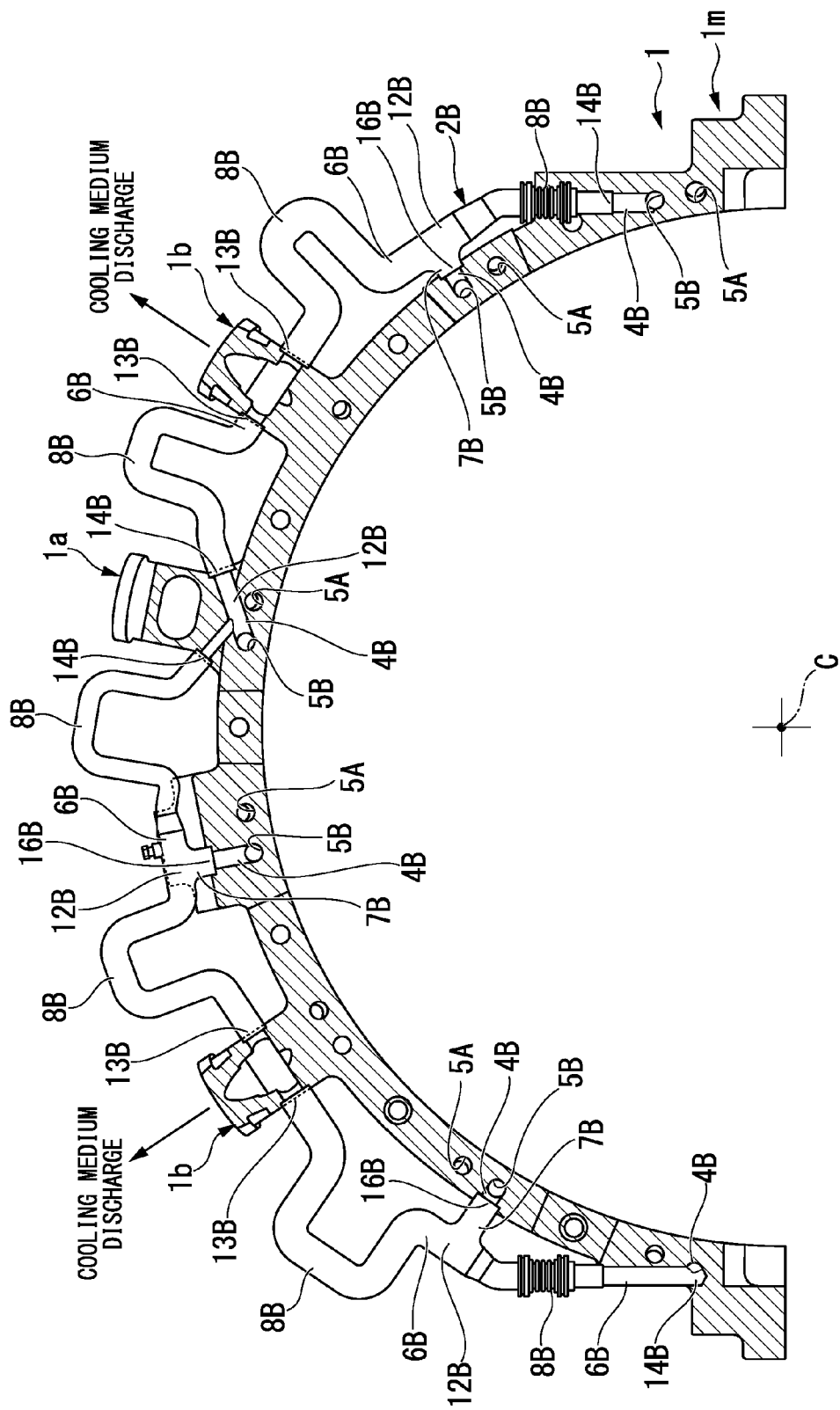
FIG. 7 is a view explaining an outer channel for discharging steam according to the second embodiment.

As shown in FIGS. 6 and 7, the present embodiment is different from the first embodiment in that a tube (hereinafter, referred to as curved tubes 8A and 8B) curved so as to be folded in a direction crossing the circumferential direction is used instead of using the bellows tube described above in the first embodiment, and other components are the same as the first embodiment.

FIG. 6 shows the outer pipes (6A and 7A) of a steam supply system and FIG. 7 shows the outer pipes (6B and 7B) of a steam discharge system. The second embodiment is an example in which the curved tube (8A and 8B) is provided in the center portion of the outer pipe (6A and 6B) in which both ends are supported by the fixing portion fixed to the blade ring 1 or the branch piping coupling instead of the bellows tube as the thermal stress absorber applied to the first embodiment. However, in a portion of the pipes, since a sufficient space in which the curved tube (8A and 8B) is disposed between the fixing portions or the branch piping couplings is not present, the bellows tube similar to the first embodiment is disposed. Other components are similar to the first embodiment.

According to the gas turbine of the present embodiment, effects similar to those of the above-described embodiment are exhibited.

Since the thermal stress absorbing portions 8A and 8B are tubes (curved tubes) curved so as to be folded in the direction crossing the circumferential direction, the following operation and effects are obtained.

That is, during operation, since the blade ring 1 has a higher temperature than the first outer channel (6A and 7A), thermal stress occurs in the tube portion 6A in the direction of expanding the tube portion 6A in the circumferential direction due to the thermal elongation difference between the blade ring 1 and the channel (6A and 7A). However, the curved tube 8A of the tube portion 6A bends in the circumferential direction (that is, expands in the circumferential direction as the thermal stress absorbing portion 8A), and thus, the thermal stress is decreased. Since the second outer channel (6B and 7B) has higher temperature than the blade ring 1, it is considered that thermal stress occurs in the tube portion 6B in the direction of contracting the tube portion 6B in the circumferential direction due to the thermal elongation difference between the channel (6B and 7B) and the blade ring 1. However, the curved tube 8B of the tube portion 6B bends in the circumferential direction (that is, contracts in the circumferential direction as the thermal stress absorbing portion 8B), and thus, the thermal stress is decreased.

Thereby, manufacturing cost can be reduced while securing properties similar to the thermal stress absorbing portions 8A and 8B described in the above-described embodiment. In addition, in the curved tube of the present embodiment, since the cost is lower than the bellows tube, the curved tube of the present embodiment has advantages in terms of economical efficiency of the gas turbine.

Moreover, the present invention is not limited to the embodiments, and various modifications can be added within a scope which does not depart from the gist of the present invention.

For example, the above-described embodiments are described using the cooling steam as a cooling medium. However, a cooling medium other than the cooling steam, for example, such as air may be used. In the above-described embodiments, the gas turbine is provided with the blade rings 1 having the channel 2 through which the cooling steam is flowed, wherein the blade rings are aligned in the direction of the turbine shaft C. However, the present invention is not limited thereto, and it is only necessary that at least one such blade ring 1 is provided.

After the cooling steam cools the blade ring 1, the cooling steam is flowed through the channel of the combustor and cools the combustor. However, it is only necessary that the cooling steam cools at least the blade ring 1, and the cooling steam may be recovered without cooling the combustor.

In the outer channel (6A, 6B, 7A, and 7B), the one thermal stress absorbing portions 8A or 8B is disposed between fixing portions adjacent to each other in the circumferential direction. However, the multiple thermal stress absorbing portions may be disposed between the fixing portions.

Among the outer channels (6A, 6B, 7A, and 7B), the first outer channel (6A and 7A) for supplying steam is provided as an inner channel, and only the second channel (6B and 7B) for discharging steam may be provided as an outer pipe. Conversely, only the first outer channel (6A and 7A) for supplying steam is provided, and the inner channel may be provided instead of the second outer channel (6B and 7B) for discharging steam.

In the above-described second embodiment, the curved tube (the portion between fixing portions adjacent in the circumferential direction of the tube portions 6A and 6B or the branch piping couplings) which is the thermal stress absorbing portions 8A and 8B is formed so as to be folded in the radial direction. However, the present invention is not limited thereto. That is, it is only necessary that the curved tubes 8A and 8B are curved so as to be folded in the direction crossing the circumferential direction, and for example, the curved tubes 8A and 8B may be formed so as to be folded in the turbine shaft C direction.

In addition, the components described in the above-described embodiments and modification examples (also, the above-mentioned provisions or the like) of the present invention may be appropriately combined. It is also possible to replace the above-described components with well-known components within the scope which does not depart from the gist of the present invention.

DESCRIPTION OF SYMBOLS

1 (1*m*, 1*n*): blade ring
2 (2A, 2B): channel
4 (4A, 4B): inner channel
6A, 6B, 7A, 7B: outer channel
8A, 8B: thermal stress absorbing portion
11: connection tube (connection channel)
12A, 12B: branch piping coupling (fixing portion)
13A, 13B: connection end (fixing portion)
14A, 14B: end portion of tube portions 6A and 6B directly fixed to blade ring (fixing portion)
15A: curved piping coupling (fixing portion)
16A, 16B: end portion of tube portions 7A and 7B (fixing portion)
C: turbine shaft

The invention claimed is:

1. A gas turbine comprising:
    a blade ring which faces blades from the outer side in a radial direction perpendicular to a turbine shaft; and
    a channel provided in the blade ring and through which a cooling medium is flowed, wherein
    the channel includes:
    an inner channel formed in the blade ring; and
    a tubular outer channel which is connected to the inner channel, is disposed in an outer portion of the blade ring, and extends in a circumferential direction of the blade ring, and wherein
    the outer channel includes:
    a plurality of fixing portions fixed to the blade ring;
    a thermal stress absorbing portion disposed between the fixing portions adjacent in the circumferential direction and is expandable in the circumferential direction;
    a first outer channel configures a supply system; and
    a second outer channel configures a discharge system, which is disposed so as to be adjacent to the first outer channel in a direction of the turbine shaft.

2. The gas turbine according to claim 1, wherein the thermal stress absorbing portion is a bellows tube.

3. The gas turbine according to claim 1, wherein the thermal stress absorbing portion is a tube bent so as to be folded in a direction crossing the circumferential direction.

\* \* \* \* \*